F. DANZENBAKER.
BEEHIVE.
APPLICATION FILED MAY 29, 1911.

1,048,950.

Patented Dec. 31, 1912.
2 SHEETS—SHEET 1.

WITNESSES

E. M. Gilbert
A. F. Hayes

INVENTOR
Francis Danzenbaker
by Chas. Williamson
Attorney

F. DANZENBAKER.
BEEHIVE.
APPLICATION FILED MAY 29, 1911.
1,048,950.
Patented Dec. 31, 1912.
2 SHEETS—SHEET 2.
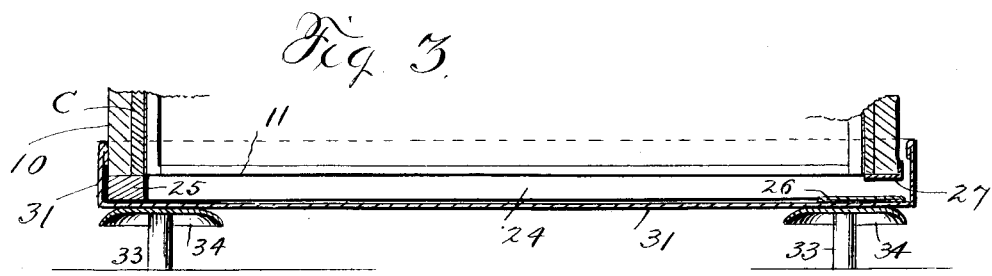
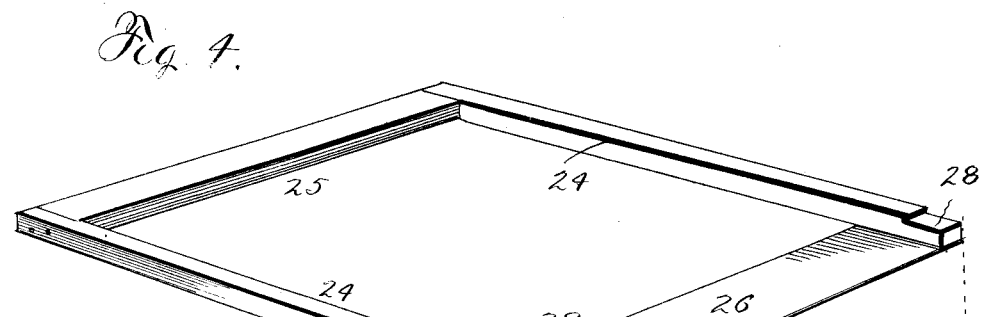
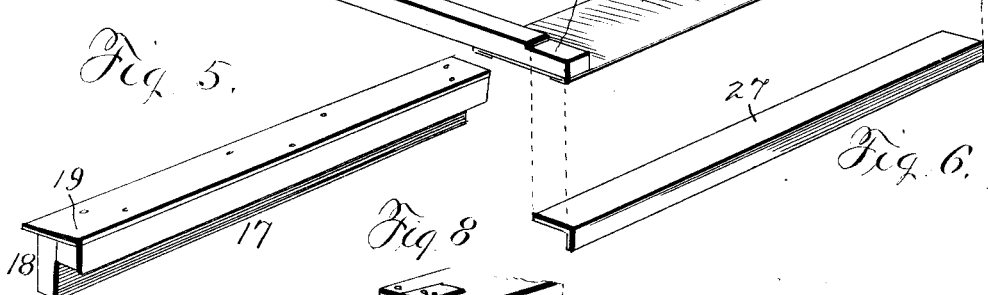
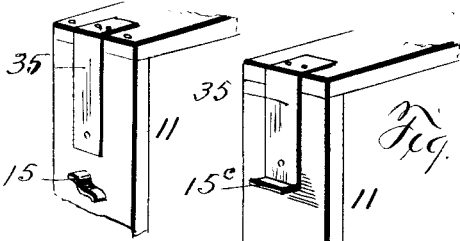
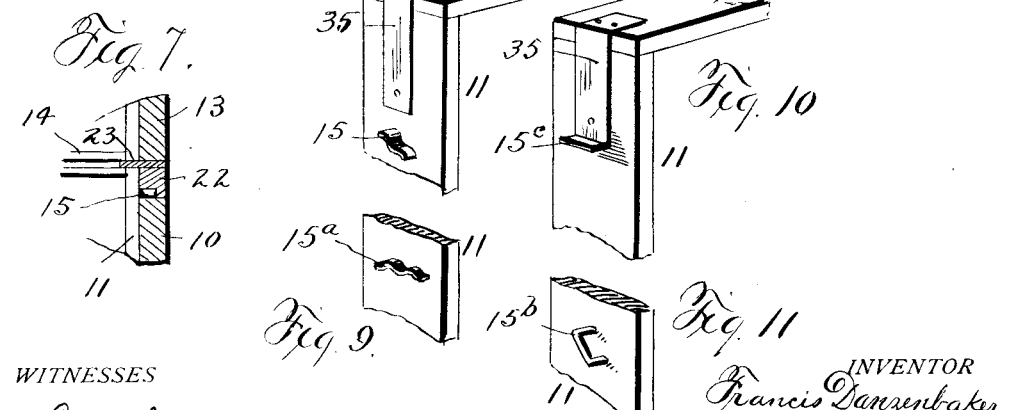
WITNESSES
E. W. Gilbert
A. F. Hayes
INVENTOR
Francis Danzenbaker,
by Chas. J. Williamson
Attorney

UNITED STATES PATENT OFFICE.

FRANCIS DANZENBAKER, OF NORFOLK, VIRGINIA, ASSIGNOR TO ROBERT JOHNSON, OF NORFOLK, VIRGINIA.

BEEHIVE.

1,048,950. Specification of Letters Patent. Patented Dec. 31, 1912.

Application filed May 29, 1911. Serial No. 630,220.

*To all whom it may concern:*

Be it known that I, FRANCIS DANZENBAKER, of Norfolk, in the county of Norfolk, and in the State of Virginia, have invented a certain new and useful Improvement in Beehives, and do hereby declare that the following is a full, clear, and exact description thereof.

In the commercial exploitation of bees important considerations are protection of bees from their natural enemies, simplicity of hive construction, whereby inexpensiveness of manufacture is secured and time and labor in the manipulation thereof saved, and the utilization of bees to the utmost in gathering honey, so that the waste of bee energy involved in keeping the hive at proper temperature, in gathering and applying propolis, etc., may be avoided.

The object of my invention, therefore, is the production of a hive having especially in mind the considerations mentioned and in producing my hive I have taken into account the experience of a lifetime in bee culture in which I have familiarized myself with the conditions, both, from the hive manufacturer's standpoint and from the standpoint of the apiarist in the bee yard.

Figure 1:
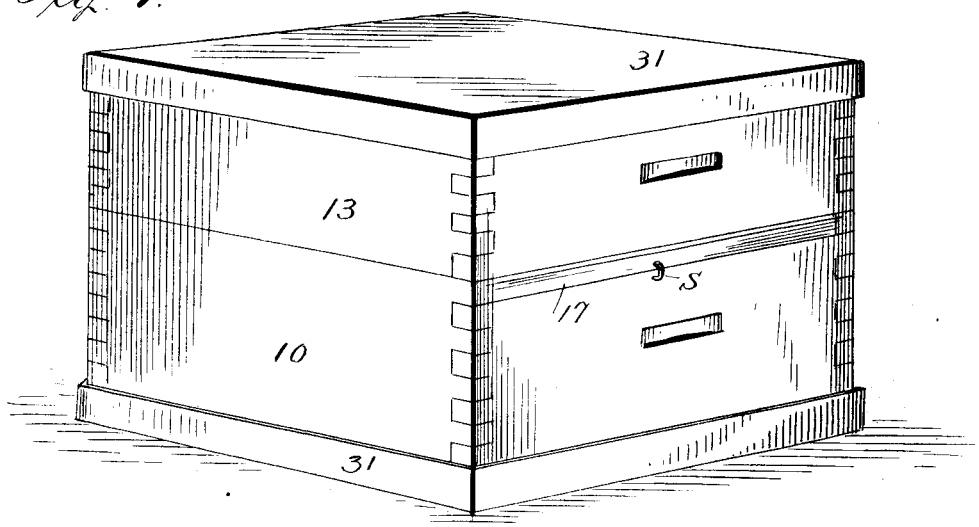
Figure 2:
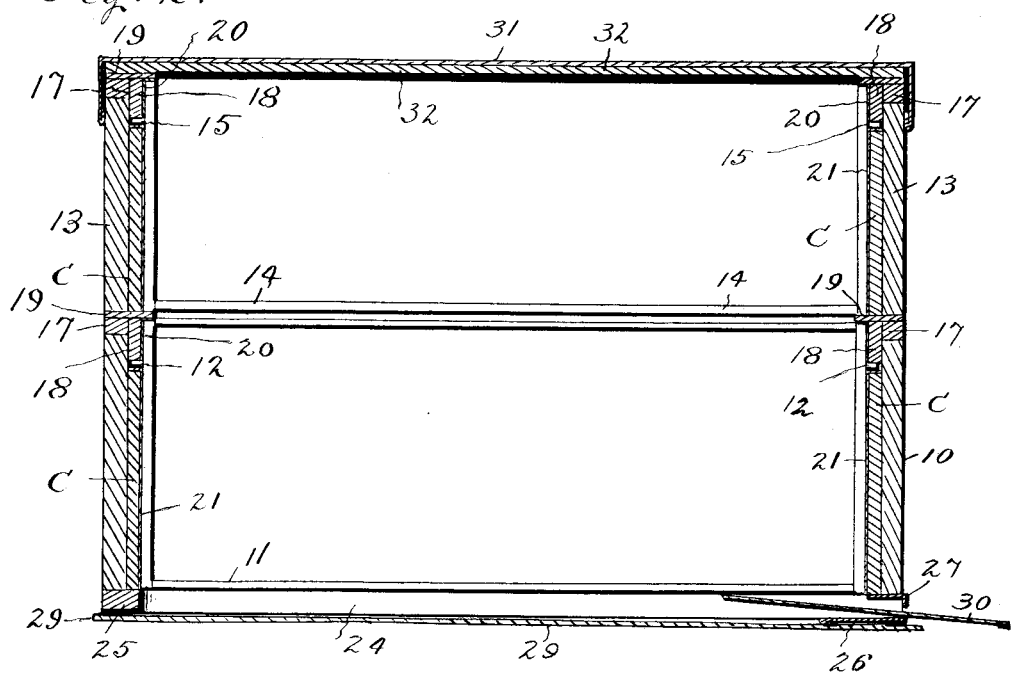

In the accompanying drawings—Figure 1 is a perspective view of a bee hive embodying my invention, including a brood frame and a super arranged for feeding and showing a feeding pan when used as a storm cover; Fig. 2 is a vertical section from front to rear of the hive embodying my invention, the feeding pan being removed and the alighting board being shown in position; Fig. 3 is a similar view with the parts arranged as in Fig. 1, but showing only the lower portion of the hive; Fig. 4 a detail view in perspective of my hive bottom; Fig. 5 a detail view in perspective of the guard and filling rail or strip that I employ; Fig. 6 a detail view in perspective of the sheet metal rail or strip for controlling the size of the hive entrance; Fig. 7 a detail view in section showing a somewhat different construction of guard and filling strip and the appurtenant parts from what is shown in Figs. 2 and 5; Fig. 8 is a detail perspective view of a portion of a brood frame showing how the top and end bars may economically be joined; Fig. 9 a similar view showing a different form of supporting pin; Fig. 10 a perspective view corresponding with Fig. 8, showing a combined brace and support; and Fig. 11 a perspective view showing portion of the end bar of the brood frame in still another form of support.

In the embodiment of my invention illustrated in the drawings, I show a brood chamber 10 containing brood frames 11, whose end bars have outwardly projecting pins 12 which rest upon a supporting ledge at the front and back walls, respectively, of the hive body; and a super 13 containing comb honey section holders 14 whose end bars have outwardly projecting supporting pins 15 that rest upon ledges at the front and back walls, respectively, of the super hive body. As illustrated in Fig. 2, said supporting ledges for both the brood frames and the section holders are formed by cleats C that are fastened to the inner side of the front and back walls of the hive bodies with their upper edges some distance below the top edge of the hive body, the result being that at the front and back of the hive spaces of considerable size exist.

In all respects thus far described the hive structure is old, and one of the objects of my invention is to get rid of the spaces above the cleats C that I have just referred to, the existence of which spaces is objectionable, because they require to be heated to maintain the proper hive temperature, and they require to be protected or guarded by the bees against the wax moth, the result being that for both of these purposes a large number of bees must remain in the hive which otherwise would usefully be employed in gathering nectar. For this purpose I have devised the special form of bar or rail 17 illustrated in Figs. 2 and 7, which has a vertical tongue 18 that snugly fits the space above the cleat C between the end wall of the hive body and the ends of the brood frames or section holders, and a horizontally projecting flange 19 at the top of the tongue 18 which extends on both sides thereof, so that on one side it overlaps and fills the cutaway upper edge of the hive body end wall, and on the opposite side projects over the tops of the brood frames or the comb section holders and the interposed fences or partitions to an extent sufficient to cover all the cracks or joints at this point. The strip or rail, it will be seen, is T-shaped in cross section, comprising as it does a vertical tongue and a flange on both sides of the tongue at the top thereof. My object in extending the flange 19 inward to overlap the adjacent parts, which contain many joints, is to prevent the necessity on the part of the bees of sealing up such joints which is objectionable both as wasting the energy and time of the bees and as being troublesome to the apiarist by reason of the sticking of the parts together and the necessity of cleaning them. In the case of both the brood frames and the section holders, I locate the supporting pins 15 the same distance from the top so that the guard and safety rails 17 may be of uniform or standard size, whether for use in brood frames or supers. In the case of the brood frames this necessitates the location of the pins away from the vertical center of the end bars of the frame, and hence the reversibility of the brood frames by revolving them is not possible. However, in this connection I have made an important improvement, because, with the rails 17 in place the lower edge of the tongue 18 will bear upon the tops of the supporting pins so that by securing the rails 17 to the hive body, as by a simple staple S (see Fig. 1) driven into adjacent portions of the rail and hive body, the brood frames will be securely held in the hive body and the frames and hive body may be bodily reversed, so that the reversing operation is a simple and instantaneous act and a great improvement over the old procedure which required the separate reversing of each brood frame.

Supplementing the guard or filling rails 17, I may use an inverted L-shape propolis shield 20, whose horizontal flange lies beneath the inwardly extending portion of the flange 19 and whose vertical flange extends down alongside of the inner side of the tongue 18. Said shield 20 may be sheet metal, but I prefer to make it of paper treated with a preparation of tar or rosin or some other substance that is offensive to the young of the bee moth. Paper is preferred because by reason of its pliability or flexibility, it more readily conforms to the wooden surfaces over which it is placed which are more or less irregular and it prevents the bees from sticking the inwardly projecting portion of the flange 19 to the brood frames or the holders. I also, preferably, interpose a sheet of paper 21 also tarred or otherwise treated to be offensive to the bee moth between the end bars of the frames or holders and the inner side of the cleats C, the top edge of the paper being folded to overlie the upper edge of the cleat C on which the supporting pins 15 rest. The paper 21 prevents the bees sticking the end bars of the supporting cleats so that the removal of the brood frames and section holders is rendered easier, and if the paper is treated as I prefer, it also performs the important purpose of keeping out injurious insects, such as moths and ants.

As illustrated in Fig. 7, instead of employing the cleats C they may be discarded and thus the spaces above them eliminated by resting the supporting pins 15 upon the cutdown upper edge of the hive body ends and in this case the guard and filling strip instead of being T-shape, as shown in Figs. 2 and 5, is of an inverted L-shape with a vertical member 22 and an inwardly projecting horizontal flange 23, the inner lower corner of the vertical member being cut away or channeled or grooved to accommodate the supporting pins 15. It will be evident that by employing the construction shown in Fig. 7, either the internal capacity of the hive from front to back may be increased or its external size diminished with resulting economy of material.

My hive bottom can best be seen by reference to Fig. 4, and is an open or skeleton structure comprising parallel side bars 24 and a rear cross bar 25, said bars being of wood, and preferably a sheet metal cross bar 26 connecting the front ends of the side bars at the underside. The width of the cross bar 25 in cross section is equal to the thickness of the rear wall and the cleat attached thereto so that the inner vertical surface of the rear member of the hive body and the inner edge of said cross bar are in vertical alinement, the object being to enable the bees at the rear of the hive to climb directly from the bottom into the hive body instead of traversing a circuitous or roundabout course or doubling upon their path as has been the case heretofore, and to diminish the exposed surfaces which the bees would propolize and get rid of spaces or cavities in which moths might be harbored. The space between the front ends of the side bars 24 forms the bee entrance or passage, and for contracting the entrance in winter and keeping out mice I employ a simple L-shape strip 27 of sheet metal, one flange of which may be seated in shallow recesses 28 in the upper side of the front ends of the side bars 24 beneath the hive body, the other flange hanging vertically therefrom over the entrance. By the mere reversal of said strip 27, placing its vertical flange uppermost the entrance can be restored to its full size.

Beneath the bottom I place a loose sheet 29 of metal, asbestos slate, or other cold hard surface the characteristic of coldness and hardness being employed as presenting conditions inimical to the wax moth whose grub burrows in such a favoring material as wood, and I employ an alighting board 30 of wood, which as clearly shown in Fig. 2, is extended partially within, and partially without the hive entrance, resting upon the bottom metal strip 26 and tilting upward and rearward at a slight angle. Should the moth deposit its eggs upon the hard cold sheet 29 and the eggs hatch, the grubs discovering the wooden alighting board, and especially since a contracted space or cavity would exist between the rear portion of the latter within the hive and the sheet 29, would attach themselves to and burrow in the underside of the alighting board so that by the removal of the latter at frequent intervals the presence of the moth grubs would be discovered and they could be destroyed.

A very important advantage from my open frame form of bottom is, that when it is desired to increase the space below the brood frames it can be done simply by superimposing one bottom upon another. With my new bottom a very simple form of bee escape can be used consisting of a simple bar of wood provided with one or more suitably protected holes that permits the bees to pass out of the hive in one direction but prevents their return in the opposite direction. The same device can be used as a robber trap merely by reversing it.

By reference to Figs. 1 and 3 will be found a sheet metal pan 31 in which the hive may stand, it being thus surrounded on all four sides at the bottom by the vertical side walls of the pan. This pan forms a simple and yet most efficient feeder, the syrup or feed being very easily supplied merely by pouring it through the uncovered top of the hive body and allowed to stand at a desired level in the pan where it is readily reached by the bees. It will be seen that during a feeding operation bees within the hive are imprisoned because the entrance opening is closed by one of the side walls of the pan and it is impossible for strange bees to get into the hive. Such ventilation as is necessary is secured by removing the combined guard and filling rails 17. When not in use as a feeder the pan can be put to any one of a number of uses, for example, as illustrated in Figs. 1 and 2, by inverting it it forms a splendid storm cover, the usual top cover 32 in the form of a simple oblong board being interposed between the pan and the top of the hive, and when thus applied to the hive a second hive may be supported upon it, because it provides a perfectly flat top. Again the pan 31 may be used as a solar extractor simply by covering it with a sheet of glass; and it may also be used as a capping holder and when thus used, if tilted at a slight angle the honey will drain from the cappings. In order completely to exclude ants from the hive, I support it upon a number of similar devices each in the form of a mushroom comprising a central stalk or foot 33, and an inverted cup shape head 34, preferably, of sheet metal so that its surface is smooth. Ants while able to climb the foot 33 and perhaps to cross the underside of the head 34 will be unable to pass around the downwardly extending flange of the head.

The brood frame and section frame supporting pins may be of any desired construction, but as clearly illustrated in Fig. 8, I prefer a corrugated nail form of pin 15 which may easily be driven into the end bar of the frame and yet holds very strongly, and I place it at an angle, or obliquely, so that the bearing edge it offers is very narrow, and yet by reason of its corrugated form it affords a very firm support. As shown in Fig. 9 a wider corrugated nail 15$^a$ is employed, and it is arranged horizontally; while, as shown in Fig. 11, a double pointed tack 15$^b$ is used.

Practically before in construction brood frames is to connect the bars thereof by a dove-tail connection, but a much cheaper and yet amply strong construction is that which I illustrate clearly in Figs. 8 and 10, where no dove-tail or any other special connection is used, but the top bar rests upon the upper ends of the end bars and is nailed thereto, and a sheeet metal strap 35 bent at an angle so as to overlap the top bar and engage the outer side of the end bar and to tack or nail both bars, is used. As illustrated in Fig. 10, the lower end of said strap may be bent horizontally to form a support 15$^c$ making the employment of an extra pin unnecessary.

Having thus described my invention what I claim is—

1. The combination of a hive body having a ledge for supporting frames or holders, and a filling rail for the spaces above said ledge having an inwardly projecting flange.

2. The combination of a hive body having a ledge for supporting frames or holders, a filling rail for the space above said ledge having an inwardly projecting flange, and a strip of treated material interposed between said rail and contiguous hive members.

3. The combination of a hive body having a ledge for supporting frames or holders, and a filling rail for the spaces above said ledge having inwardly and outwardly projecting flanges.

4. In a bee hive, the combination of a hive body having below its upper edge and on its inner side a ledge, frames or holders having end bars with pins engaging said ledge, a bar composed of a vertical tongue, and oppositely extending flanges at the top of the tongue, said tongue engaging said pins.

5. In a bee hive, the combination of a hive body having below its upper edge and on its inner side a ledge, frames or holders having end bars with pins engaging said ledge, a bar composed of a vertical tongue and oppositely extending flanges at the top of the tongue, said tongue engaging said pins, and sheet material interposed between said end bars and the inner surface of the hive.

6. In a bee hive, the combination of a hive body having below its upper edge and on its inner side a ledge, frames or holders having end bars with pins engaging said ledge, a bar composed of a vertical tongue, and oppositely extending flanges at the top of the tongue, said tongue engaging said pins, sheet material interposed between said end bars and the inner surface of the hive, and treated paper between said end bars and the inner surface of the hive.

7. The combination of a hive body, a bottom having side bars with an open space between the side bars forming a bee passage, the tops of said side bars being recessed at their ends, and a device for controlling the passage consisting of a strip that is L-shaped in cross section, one of the flanges of said strips being received in said recesses.

8. The combination of a bee hive having a bee entrance and a bottom surface that possesses characteristics of low temperature and hardness, and an alighting board of wood extending partially within and partially without the bee entrance, the part within overlying said bottom surface and spaced above the same.

In testimony that I claim the foregoing I have hereunto set my hand.

FRANCIS DANZENBAKER.

Witnesses:
J. A. MORIARTY,
CHAS. J. WILLIAMSON.

Copies of this patent may be obtained for five cents each, by addressing the "Commissioner of Patents, Washington, D. C."